(12) United States Patent
Kim et al.

(10) Patent No.: US 8,490,122 B2
(45) Date of Patent: Jul. 16, 2013

(54) DISC CHUCKING METHOD AND DISC DRIVING APPARATUS

(75) Inventors: Jong-cheol Kim, Suwon-si (KR); Chung-ung Kim, Yongin-si (KR); Ki-ju Lee, Suwon-si (KR); Jong-jin Park, Yonging-si (KR); Dong-hwi Cho, Suwon-si (KR); Su-bong Bae, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 276 days.

(21) Appl. No.: 12/720,088

(22) Filed: Mar. 9, 2010

(65) Prior Publication Data

US 2010/0257547 A1 Oct. 7, 2010

(30) Foreign Application Priority Data

Apr. 1, 2009 (KR) ........................ 10-2009-0028255

(51) Int. Cl.
*G11B 17/03* (2006.01)
(52) U.S. Cl.
USPC ......... 720/706; 720/704; 720/710; 369/75.21
(58) Field of Classification Search
USPC ............ 720/704, 706, 710; 360/99.02, 99.06; 369/75.21
See application file for complete search history.

(56) References Cited

U.S. PATENT DOCUMENTS

| 5,297,122 | A | 3/1994 | Christie |
| 5,633,850 | A * | 5/1997 | Park .............................. 720/608 |
| 6,169,711 | B1 * | 1/2001 | Koh .......................... 369/30.36 |
| 6,529,462 | B1 | 3/2003 | Kurozuka et al. |
| 7,308,694 | B2 * | 12/2007 | Someno ........................ 720/696 |
| 2004/0264323 | A1 | 12/2004 | Worthington et al. |
| 2005/0015785 | A1 * | 1/2005 | Kajita ........................... 720/605 |

FOREIGN PATENT DOCUMENTS

| KR | 10-2008-0003404 | 1/2008 |
| KR | 10-2008-0005224 | 1/2008 |
| WO | 2006/121266 A1 | 11/2006 |
| WO | 2007/001160 A1 | 1/2007 |

OTHER PUBLICATIONS

European Search Report dated Jun. 18, 2010 and issued in corresponding European Patent Application 10156575.2.

* cited by examiner

*Primary Examiner* — Hoa T Nguyen
*Assistant Examiner* — Carlos E Garcia
(74) *Attorney, Agent, or Firm* — Staas & Halsey LLP

(57) ABSTRACT

Provided are a disc chucking method of preventing mischucking from occurring according to a state and direction of a disc loaded onto a tray when the tray is closed, and a disc driving apparatus for performing the disc chucking method. The method include: opening a tray on which a disc in which a first magnet is installed is loadable; moving a feeding unit to a position where attraction between a second magnet installed in the feeding unit and the first magnet is relatively low; and if the tray is closed, placing a center of the disc in a turn table.

11 Claims, 5 Drawing Sheets

DISC CHUCKING METHOD AND DISC DRIVING APPARATUS

CROSS-REFERENCE TO RELATED APPLICATIONS

This application claims the benefit of Korean Patent Application No. 10-2009-0028255, filed on Apr. 1, 2009, in the Korean Intellectual Property Office, the disclosure of which is incorporated herein in its entirety by reference.

BACKGROUND

1. Field

The inventive concept relates to disc chucking and, more particularly, to a disc chucking method performed by a disc driving apparatus in which magnets are installed in a disc and a feeding unit, and the disc driving apparatus for performing the disc chucking method.

A disc in which a magnet is installed is, for example, a bio disc. The bio disc may be defined as a digital bio disc in which a lab on a chip, including various diagnosis and analysis devices, nucleic acid hybrid analysis devices, or immunological verification devices, is installed.

An analysis resultant, such as a reaction paper used to monitor an analysis result or a test result, may be installed to the bio disc (hereinafter referred to as "disc"). When the analysis resultant is monitored, respective magnets installed in the disc and the feeding unit may be used to fix the disc to a position where an image sensor or a camera unit can recognize the analysis resultant. The magnet installed in the feeding unit may be used to turn on/off a valve of the disc. After the disc is loaded onto a tray, when the disc is placed in a turn table, mis-chucking may occur according to the state and direction of the disc loaded onto the tray.

2. Description of the Related Art

The inventive concept relates to disc chucking, and more particularly, to a disc chucking method performed by a disc driving apparatus in which magnets are installed in a disc and a feeding unit, and the disc driving apparatus for performing the disc chucking method.

A disc in which a magnet is installed is, for example, a bio disc. The bio disc may be defined as a digital bio disc in which a lab on a chip, including various diagnosis and analysis devices, nucleic acid hybrid analysis devices, or immunological verification devices, is installed.

An analysis resultant, such as a reaction paper used to monitor an analysis result or a test result, may be installed to the bio disc (hereinafter referred to as "disc"). When the analysis resultant is monitored, respective magnets installed in the disc and the feeding unit may be used to fix the disc to a position where an image sensor or a camera unit can recognize the analysis resultant. The magnet installed in the feeding unit may be used to turn on/off a valve of the disc. After the disc is loaded onto a tray, when the disc is placed in a turn table, mis-chucking may occur according to the state and/or direction of the disc loaded onto the tray.

SUMMARY

Additional aspects and/or advantages will be set forth in part in the description which follows and, in part, will be apparent from the description, or may be learned by practice of the invention.

The inventive concept provides a disc chucking method of preventing mis-chucking from occurring according to the state and/or direction of a disc loaded onto a tray when the tray is closed, and a disc driving apparatus for performing the disc chucking method.

According to an aspect of the inventive concept, there is provided a disc chucking method including: opening a tray on which a disc in which a first magnet is installed is loadable; moving a feeding unit to a position where attraction between a second magnet installed in the feeding unit and the first magnet is, reduced or relatively low; and if the tray is closed, placing a center of the disc in a turn table.

The moving of the feeding unit may include: moving the feeding unit to the outermost circumference of the disc.

The placing of the center of the disc in the turn table may include: moving the feeding unit from an outer circumference of the disc to an inner circumference of the disc at least once.

The placing of the center of the disc in the turn table may further include: performing a first movement when the feeding unit moves from the inner circumference of the disc to the outer circumference of the disc and a second movement when the feeding unit moves from the outer circumference of the disc to the inner circumference of the disc during a predetermined period several times.

The method may further include: when the center of the disc is placed in the turn table, moving the feeding unit to the outermost circumference of the disc.

According to another aspect, a disc chucking apparatus including: a tray on which a disc in which a first magnet is installed is loaded; a feeding unit in which a second magnet is installed; a feeding motor feeding the feeding unit; and a control unit, moving the feeding unit to a position where attraction between the second magnet and the first magnet is reduced when the tray is open, and, controlling the feeding motor to allow the feeding unit to move so that a center of the disc is placed in a turn table when the tray is closed, and performing chucking of the disc is provided.

The control unit may control the feeding motor to allow the feeding unit to move the outermost circumference of the disc when the tray is open.

When the center of the disc is placed in the turn table, the control unit may control the feeding motor to allow the feeding unit to move from an outer circumference of the disc to an inner circumference of the disc at least once.

When the center of the disc is placed in the turn table, the control unit may control the feeding motor to perform a first movement when the feeding unit moves from the inner circumference of the disc to the outer circumference of the disc and a second movement when the feeding unit moves from the outer circumference of the disc to the inner circumference of the disc during a predetermined period several times.

After the center of the disc is placed in the turn table, the control unit may control the feeding motor to allow the feeding unit to move to the outermost circumference of the disc.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Figure 1:
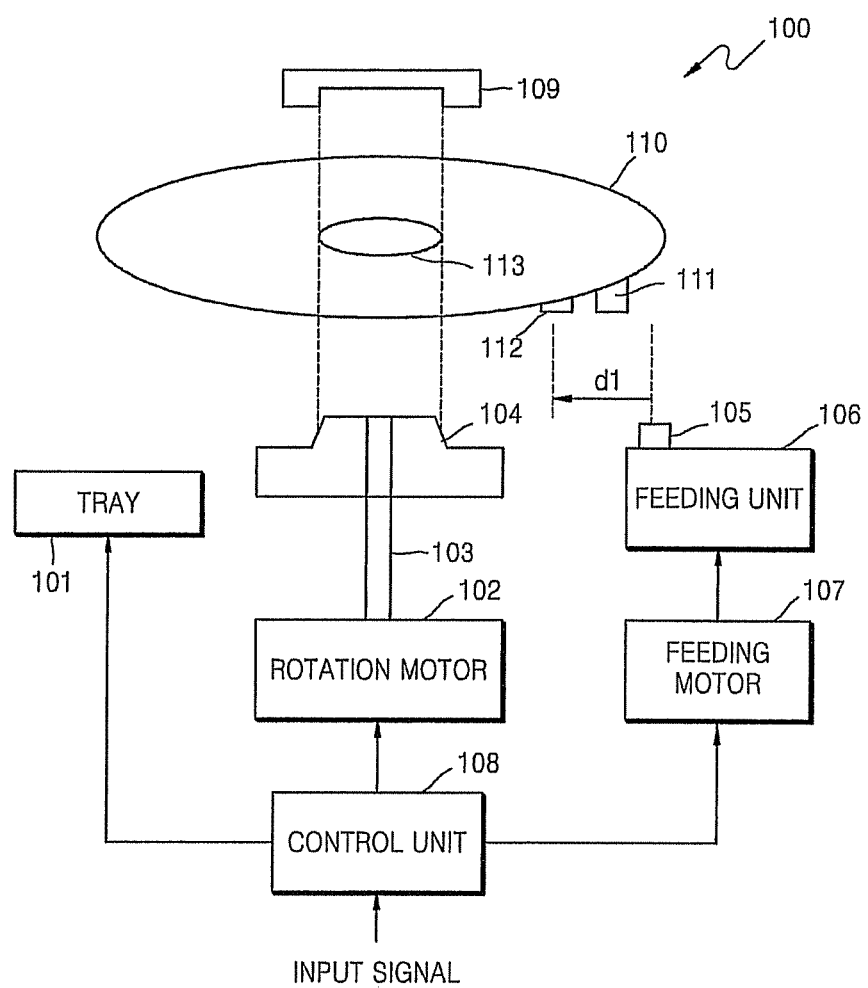
FIG. 1 is a block diagram of a disc driving apparatus according to an exemplary embodiment.

Reference will now be made in detail to the embodiments, examples of which are illustrated in the accompanying drawings, wherein like reference numerals refer to the like elements throughout. The embodiments are described below to explain the present invention by referring to the figures.

The inventive concept will now be described more fully with reference to the accompanying drawings, in which exemplary embodiments of the invention are shown. Like reference numerals in the drawings denote like elements.

FIG. 1 is a block diagram of a disc driving apparatus 100 according to an exemplary embodiment. Referring to FIG. 1, the disc driving apparatus 100 includes a tray 101, a rotation motor 102, a rotation axis 103, a turn table 104, a feeding unit 106 in which a magnet 105 is installed, a feeding motor 107, a control unit 108, and a clamper 109.

A disc 110 is a medium that is loadable onto the tray 101. A magnet 111 and an analysis resultant 112 are installed in the disc 110. The magnet 111 may be a permanent magnet. The analysis resultant 112 may be an analysis site or a reaction paper. The disc 110 may be a non-optical bio disc or an optical bio disc.

The tray 101 onto which the disc 110 is loadable and may be open or closed according to the control of the control unit 108. However, it is understood that the tray 110 may not be controlled by the control unit 108 and may be open or closed according to the control of a dedicated open/close button (not shown).

The rotation motor 102 is controlled by the control unit 108. If a center 113 of the disc 110 is placed on the turn table 104 having the rotation axis 103, the rotation motor 102 rotates the disc 110. The rotation motor 102 may be a spindle motor.

The feeding unit 106 in which the magnet 105 is installed may be controlled by the feeding motor 107 and move in a radial direction of the disc 110. The feeding unit 106 may be a slider or a sled. Since the feeding unit 106 may include a bio optical pick-up module, the feeding unit 106 may be a bio optical pick-up unit. After the disc 110 performs an analysis or test operation, a polarity of the magnet 105 will be changed to have a different polarity from the magnet 111 installed in the disc 110 to generate a suction with regard to the magnet 111 so that the analysis resultant 112 installed in the disc 110 can be precisely disposed in a position recognized by an image sensor (not shown) or a camera module (not shown).

The feeding motor 107 is controlled by the control unit 108 and drives the feeding unit 106. The feeding motor 107 may be a slider motor or a sled motor.

If the center of the disc 110 loaded onto the tray 101 is placed in the turn table 104, the clamper 109 may generate a magnetic force with regard to the turn table 104 and press the disc 110. Thus, the disc 110 does not shake when the disc 110 performs the analysis or test operation, and, although attraction between the magnet 105 of the feeding unit 106 and the magnet 111 of the disc 110 occurs, the center 113 of the disc 110 is continuously placed in the turn table 104. To this end, the magnetic force between the clamper 109 and the turn table 104 is established to be stronger than the suction between the magnet 111 installed in the disc 110 and the magnet 105 installed in the feeding unit 106. The clamper 109 may be designed to be attached to an upper end of the disc 110 by using a both-sided adhesive or bond. When the clamper 109 is attached to the upper end of the disc 110, the clamper 109 may not be a part of the disc driving apparatus 100.

When the tray 101 is open, although the control unit 108 may not control the feeding unit 106, the control unit 108 may control the feeding motor 107 to move the feeding unit 106 to a position where the attraction (or suction) between the magnet 105 of the feeding unit 106 and the magnet 111 of the disc 110 can be, changed, minimized, reduced or relatively low. For example, the control unit 108 may control the feeding motor 107 to allow the feeding unit 106 to move to the outermost circumference of the disc 110.

If the tray 101 on which the disc 110 is loaded is closed, the control unit 108 controls the feeding motor 107 to allow the feeding unit 106 to move at least once from the outer circumference of the disc to the inner circumference of the disc by a predetermined distance d1, and performs a disc chucking operation of placing the disc 110 in the turn table 104. The predetermined distance d1 may be established for another way; when the tray 101 is open, the control unit 106 is controlled to move to the outermost circumference of the disc 110, and when tray 101 is open, the feeding unit 106 is not controlled to move to the outermost circumference of the disc 110.

Figure 2:
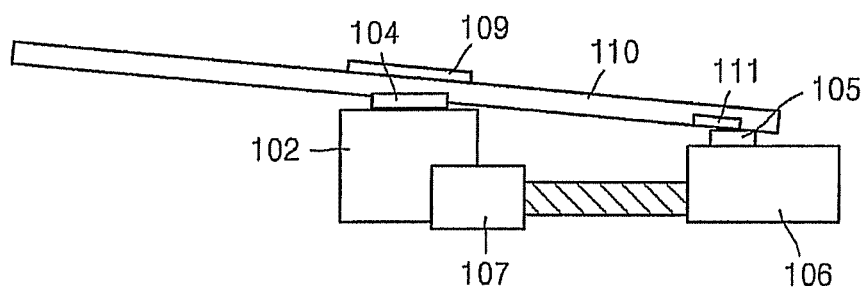
FIG. 2 illustrates mis-chucking of a disc.

When the tray 101 is closed, if mis-chucking of the disc 110 occurs as shown in FIG. 2, the predetermined distance d1 is a distance of movement of the disc 110 in a direction in which the tray 101 is open by the suction between the magnets 111 and 105 installed in the disc 110 and the feeding unit 106, respectively, and may be a distance by which the center 113 of the disc 110 can be placed in the turn table 104. Referring to FIG. 2, when the tray 101 is closed and the magnet 111 of the disc 110 loaded onto the tray 101 is disposed on a moving line of the feeding unit 106, the attraction (or suction) between the magnet 105 of the feeding unit 106 and the magnet 111 of the disc 110 occurs and, thus, the disc 110 is inclined to a place where the feeding unit 106 is disposed, which results in the occurrence of mis-chucking that the disc 110 is not placed in the turn table 104.

Therefore, when the tray 101 is open, if the feeding unit 106 is controlled to move to the outermost circumference of the disc 110, the control unit 108 may determine a moving distance of the feeding unit 106 for placing the center 113 of the disc 110 in the turn table 104 by using the magnet 105 of the feeding unit 106 that moved to the outermost circumference of the disc 110 as the predetermined distance d1.

Meanwhile, when the tray 101 is open, if the feeding unit 106 is not controlled to move to the outermost circumference of the disc 110, i.e. if the feeding unit 106 is controlled to move from the outer circumference of the disc 110 to the inner circumference of the disc 110 in view of a current position of the feeding unit 106, during the occurrence of mis-chucking, the control unit 108 may determine the predetermined distance d1 based on a maximum distance of the disc 110 that moves to the place where the feeding unit 106 is disposed within the tray 101 and the current position of the feeding unit 106.

In order to more precisely place the disc 110 in the turn table 104 after moving the feeding unit 106 from the outer circumference of the disc 110 to the inner circumference of the disc 110 once, the control unit 108 may control the feeding motor 107 to perform a first movement that the feeding unit 106 moves from the inner circumference of the disc to the outer circumference of the disc and a second movement that the feeding unit 106 moves from the outer circumference of the disc to the inner circumference of the disc several times during a predetermined time. The control unit 108 may determine the predetermined time period based on the position of the feeding unit 106 that moved from the outer circumference of the disc 110 to the inner circumference of the disc once and a distance between the center 113 of the disc 110 and the outermost circumference of the disc 110. The control unit 108 may be designed to use a previously established distance value according to the above-mentioned conditions and a previously established period value.

Figure 3:
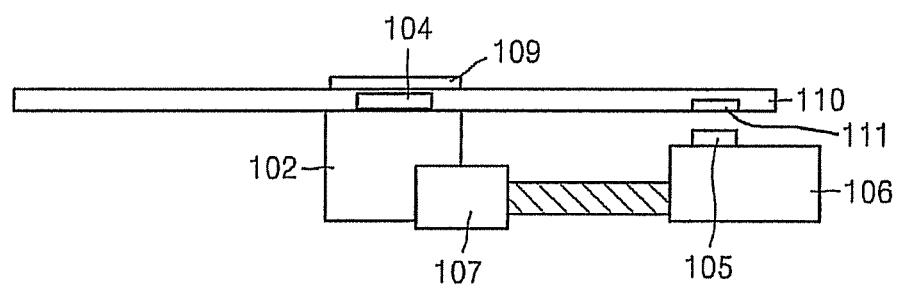
FIG. 3 illustrates a disc that is normally placed in a turn table.

The disc 110 may be normally placed in the turn table 104 as shown in FIG. 3 according to the movement of the feeding unit 106 from the outer circumference of the disc 110 to the inner circumference of the disc 110 or the movement of the feeding unit 106 from the inner circumference of the disc 110 to the outer circumference of the disc 110 and the movement of the feeding unit 106 from the outer circumference of the disc 110 to the inner circumference of the disc 110. FIG. 3 illustrates the disc 110 that is normally placed in the turn table 104.

If the disc 110 is normally placed in the turn table 104, the control unit 108 controls the feeding motor 107 to allow the feeding unit 106 to move to the outermost circumference of the disc 110, so that the magnet 105 of the feeding unit 106 does not influence a rotation of the disc 110 when the disc 110 performs the analysis or test operation.

In this regard, the control unit 108 may control the feeding motor 107 to allow the feeding unit 106 to move to the outermost circumference of the disc 110 after checking whether the disc 110 is normally placed in the turn table 104. The control unit 108 may check whether disc 110 is normally placed in the turn table 104 by using, for example, a state between the clamper 109 and the turn table 104. That is, if the disc 110 is placed in the turn table 104, magnetic force between the clamper 109 and the turn table 104 occurs. The magnetic force may be used to check whether the disc 110 is normally placed in the turn table 104.

Meanwhile, the control unit 108 may control the feeding unit 106 to move from the outer circumference of the disc 110 to the inner circumference of the disc 110 or from the outer circumference of the disc 110 to the inner circumference and from the inner circumference to the outer circumference, the disc, and may control the feeding unit to move to the outermost circumference of the disc 110, without checking whether the disc is disc 11 is normally placed in the turn table 104. When the disc 110 is placed in the turn table 104, since the magnetism between the clamper 109 and the turn table 104 is stronger than the suction between the magnet 111 of the disc 110 and the magnet 105 of the feeding unit 106, although the magnet 111 of the disc 110 is on the moving line of the feeding unit 106 as shown in FIG. 3, the center 113 of the disc 110 is continuously placed in the turn table 104.

As described above, if disc chucking of placing the disc 110 in the turn table 104 is completely performed, the disc driving apparatus 100 may rotate the disc 110 to perform the analysis or test operation.

As described above, when the tray 101 on which the disc 110 is loaded is closed by controlling the movement of the feeding unit 106, the disc driving apparatus 100 prevents mis-chucking from occurring according to the state and direction of the disc 110 loaded onto the tray 101, thereby preventing a defective operation of the disc driving apparatus 100. For example, if the disc 110 does not normally rotate due to mis-chucking, the disc 110 does not perform the analysis or test operation. Such problem can be prevented. That is, the disc driving apparatus 100 can perform a stable disc chucking operation irrespective of the state and direction of the disc 110 loaded onto the tray 101.

Figure 4:
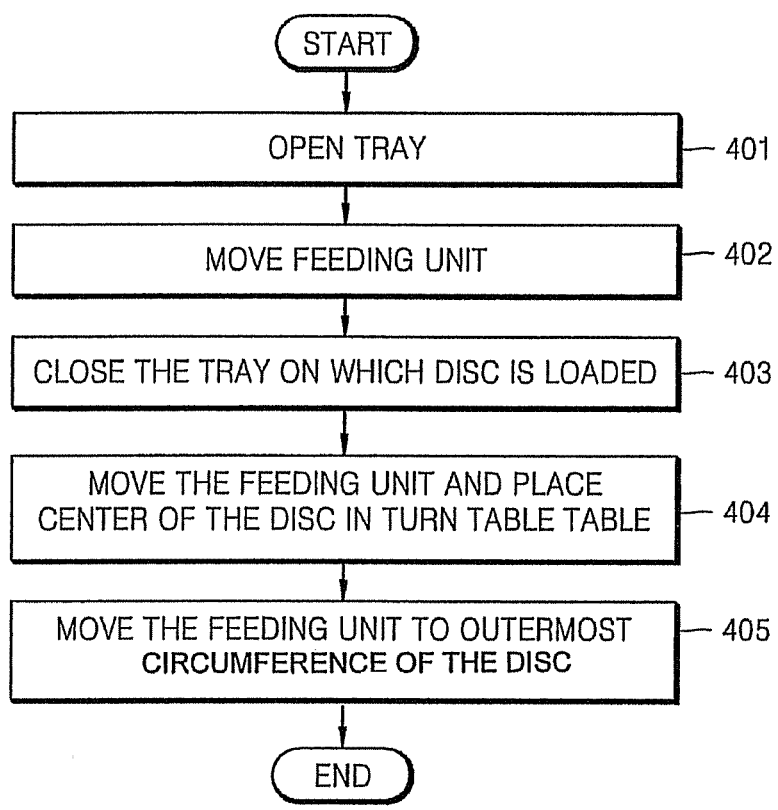
FIG. 4 is a flowchart illustrating a disc chucking method according to an exemplary embodiment.

FIG. 4 is a flowchart illustrating a disc chucking method according to an exemplary embodiment. Referring to FIG. 4, if the tray 101 is open, the feeding unit 106 moves to a position where attraction between the magnet 105 of the feeding unit 106 and the magnet 111 of the disc 110 can be minimized, and, if the tray 101 is closed, the feeding unit 106 moves, and the disc 110 is placed in the turn table 104.

In operation 401, the tray 101 is open. In operation 402, the control unit 108 moves the feeding unit 106 to the position where attraction between the magnet 105 of the feeding unit 106 and the magnet 111 of the disc 110 can be minimized, reduced or relatively low. For example, the control unit 108 may control the feeding motor 107 to allow the feeding unit 106 to move to the outermost circumference in the disc 110 to reduce the magnetic attraction force from a first value to a reduced second value.

In operation 403, the tray 101 on which the disc 110 is loaded is closed. In operation 404, the control unit 108 moves the feeding unit 106 to allow the center 113 of the disc 110 to be placed in the turn table 104. In this regard, the control unit 108 may control the feeding motor 107 to allow the feeding unit 106 to move from an outer circumference of the disc 110 to an inner circumference of the disc 110 at least once. This reduces an attractive force between the magnets 105 and 111 to allow a clamping force of clamp 109 to clamp the disc 110 onto the turntable 104. Alternatively, as described with reference to FIG. 1, the control unit 108 may move the feeding unit 106 from the outer circumference of the disc 110 to the inner circumference of the disc by a predetermined distance, and perform a first movement that the feeding unit 106 moves from the inner circumference to the outer circumference of the disc 110 and a second movement that the feeding unit 106 moves from the outer circumference of the disc 110 to the inner circumference of the disc 110 during a predetermined period several times.

If the feeding unit 106 moves and the disc 110 is normally placed in the turn table 104 as shown in FIG. 3, in operation 405, the control unit 108 controls the feeding motor 107 to allow the feeding unit 106 to move to the outermost circumference of the disc 110. Thus, the disc 110 may perform a test or analysis operation. In operation 404, the control unit 108 checks whether the disc 110 is normally placed in the turn table 104, if it is determined that the disc 110 is normally placed in the turn table 104, operation 405 may be performed.

Figure 5:
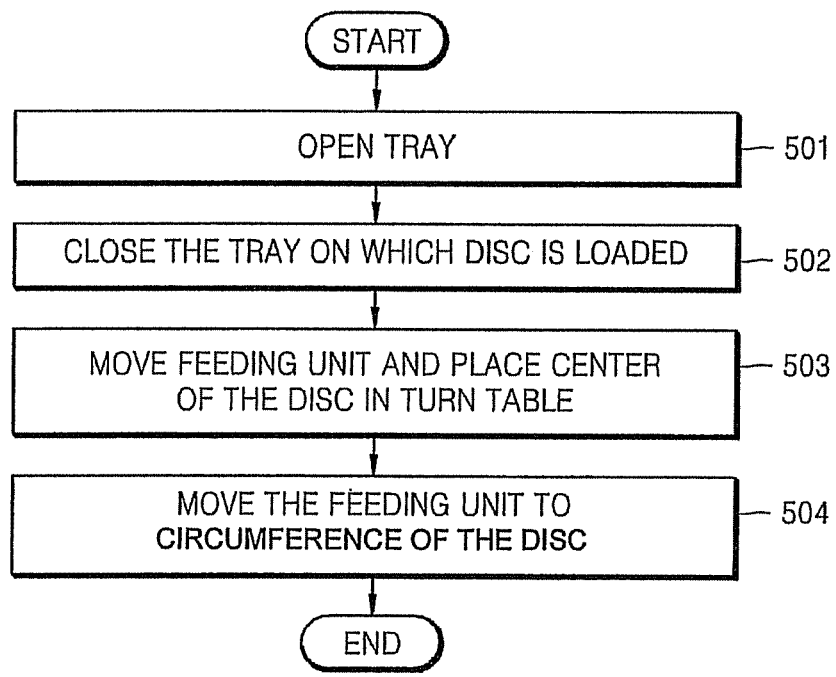
FIG. 5 is a flowchart illustrating a disc chucking method according to another exemplary embodiment.

FIG. 5 is a flowchart illustrating a disc chucking method according to another exemplary embodiment. Referring to FIG. 5, if the tray 101 is open, the feeding unit 106 does not move, the feeding unit 106 moves when the tray 101 is closed, and the disc 110 is placed in the turn table 104.

In operation 501, the tray 101 is open. In operation 502, the tray 101 on which the disc 110 is loaded is closed. In operation 503, the control unit 108 moves the feeding unit 106 to allow the center 113 of the disc 110 to be placed in the turn table 104. Operation 503 may be performed in a similar manner to operation 404 shown in FIG. 4. Thus, the disc 110 is normally placed in the turn table 104 as shown in FIG. 3.

In operation 504, the control unit 108 may control the feeding motor 107 to allow the feeding unit 106 to move to the outermost circumference of the disc. Thus, the magnet 105 of the feeding unit 106 does not influence rotation of the disc 110 when the disc 110 performs an analysis or test operation.

The inventive concept can be implemented as a method, an apparatus, and a system. When the inventive concept is implemented in software, its component elements are code segments that execute necessary operations. Programs or code segments can be stored in processor readable media and can be transmitted via a computer data signal in a transmission medium or in a communication network. The processor readable medium can be any medium that can store or transmit data. Examples of the processor readable medium include electronic circuits, semiconductor memory devices, ROMs, flash memories, erasable ROMs (EROMs), floppy disks, optical disks, hard disks, optical fibers, radio frequency (RF) networks, and the like. The computer data signal can be any signal that can be transmitted via transmission media, such as, electronic network channels, optical fibers, an electronic field, RF networks, or the like.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A disc chucking method, comprising:
opening a tray on which a disc in which a magnetic material is fixedly installed is loadable;
moving a feeding unit to a position where a magnetic attraction force between a magnet installed in the feeding unit and the magnetic material is reduced from a first value to a second value; and
upon the tray being closed, placing a center of the disc in a turn table, wherein the reduced second value of the magnetic attraction force being less than a value of a clamping force of a clamp and allowing the clamp to clamp the disc onto the turn table.

2. The method of claim 1, wherein the moving of the feeding unit comprises:
moving the feeding unit to an outermost circumference of the disc.

3. The method of claim 2, wherein the placing of the center of the disc in the turn table comprises:
moving the feeding unit from the outer circumference of the disc to an inner circumference of the disc at least once.

4. The method of claim 3, wherein the placing of the center of the disc in the turn table further comprises:
performing a first movement where the feeding unit moves from the inner circumference of the disc to the outer circumference of the disc and a second movement where the feeding unit moves from the outer circumference of the disc to the inner circumference of the disc during a predetermined period several times.

5. The method of claim 3, further comprising:
when the center of the disc is placed in the turn table, moving the feeding unit to the outermost circumference of the disc.

6. A disc chucking apparatus, comprising:
a clamp;
a tray on which a disc in which a magnetic material is fixedly installed is loaded;
a feeding unit in which a magnet is installed;
a feeding motor to feed the feeding unit; and
a control unit to move the feeding unit to a position where a magnetic attraction force between the magnet and the magnetic material is reduced from a first value to a second value when the tray is open, and, to control the feeding motor to allow the feeding unit to move so that a center of the disc is placed in a turn table when the tray is closed, and to perform chucking of the disc, wherein the reduced second value of the magnetic attraction force being less than a value of a clamping force of the clamp and allowing the clamp to clamp the disc onto the turn table.

7. The apparatus of claim 6, wherein the control unit controls the feeding motor to allow the feeding unit to move to the outermost circumference of the disc when the tray is open.

8. The apparatus of claim 7, wherein, when the center of the disc is placed in the turn table, the control unit controls the feeding motor to allow the feeding unit to move from an outer circumference of the disc to an inner circumference of the disc at least once.

9. The apparatus of claim 8, wherein, when the center of the disc is placed in the turn table, the control unit controls the feeding motor to perform a first movement where the feeding unit moves from the inner circumference of the disc to the outer circumference of the disc and a second movement where the feeding unit moves from the outer circumference of the disc to the inner circumference of the disc during a predetermined times.

10. The apparatus of claim 8, wherein, after the center of the disc is placed in the turn table, the control unit controls the feeding motor to allow the feeding unit to move to the outermost circumference of the disc.

11. A method of disc chucking for a disc having a magnetic material and a feeding unit for feeding the disc onto a turntable and having a magnet, comprising:
driving the feeding unit inward and/or outward of a circumference of the disc changing a value of a magnetic attractive force between the magnetic material and the magnet from a first value to a second value,
wherein the magnetic material is fixedly installed in the disc, a disc clamp applies a clamping force to the disc for clamping the disc onto a turntable during the driving, allowing the clamp to clamp the disc onto the turntable when the value of the magnetic attractive force is reduced from the first value to the second value.

* * * * *